(12) United States Patent
Sekine (10) Patent No.: US 12,518,758 B2
(45) Date of Patent: Jan. 6, 2026

(54) CONVERSATION ASSISTANCE METHOD USING COMPUTER

(71) Applicant: INTERACTIVE SOLUTIONS CORP., Tokyo (JP)

(72) Inventor: Kiyoshi Sekine, Tokyo (JP)

(73) Assignee: Interactive Solutions Corp., Tokyo (JP)

( * ) Notice: Subject to any disclaimer, the term of this patent is extended or adjusted under 35 U.S.C. 154(b) by 0 days.

(21) Appl. No.: 18/686,857

(22) PCT Filed: Mar. 17, 2022

(86) PCT No.: PCT/JP2022/012380
§ 371 (c)(1),
(2) Date: Feb. 26, 2024

(87) PCT Pub. No.: WO2023/026545
PCT Pub. Date: Mar. 2, 2023

(65) Prior Publication Data
US 2024/0379106 A1  Nov. 14, 2024

(30) Foreign Application Priority Data
Aug. 27, 2021 (JP) ................................ 2021-139434

(51) Int. Cl.
*G10L 15/22* (2006.01)
*G10L 15/08* (2006.01)
(52) U.S. Cl.
CPC .............. *G10L 15/22* (2013.01); *G10L 15/08* (2013.01); *G10L 2015/088* (2013.01)
(58) Field of Classification Search
None
See application file for complete search history.

(56) References Cited

U.S. PATENT DOCUMENTS 10,805,465 B1 *  10/2020  Krebs .................... G06F 40/279
10,902,481 B1 *   1/2021  Kanefsky ............ H04M 3/5166
(Continued)

FOREIGN PATENT DOCUMENTS

JP         2009-151766 A    7/2009
JP    WO 2019/017462 A1    1/2019
(Continued)

OTHER PUBLICATIONS

International Search Report of International Patent Application No. PCT/JP2022/012380 completed on Jun. 2, 2022 and mailed Jun. 14, 2022 (4 pages).
(Continued)

*Primary Examiner* — Jonathan C Kim
(74) *Attorney, Agent, or Firm* — Pyprus Pte Ltd; George Liu (57) ABSTRACT

[Problem] Provided is a conversation assistance method using a computer that ensures evaluating a conversation in real time. [Solution] A conversation assistance method using a computer includes a voice analysis step, a word group analysis step, and a remark evaluation step executed by the computer. The voice analysis step is for analyzing a voice related to a conversation and obtaining a voice word that is a word included in the conversation. The word group analysis step is for analyzing which among a plurality of term groups including either one of or both of a word and a phrase the voice word corresponds to. The remark evaluation step evaluates a remark every time a remark related to the conversation is input, based on the term group analyzed in the word group analysis step.

5 Claims, 7 Drawing Sheets

(56) References Cited

U.S. PATENT DOCUMENTS

| | | | |
|---|---|---|---|
| 11,429,834 B1* | 8/2022 | Xue | G06N 3/09 |
| 11,694,281 B1* | 7/2023 | Liu | G10L 15/30 |
| | | | 704/9 |
| 2005/0216269 A1* | 9/2005 | Scahill | H04M 3/5183 |
| | | | 704/270.1 |
| 2018/0330736 A1* | 11/2018 | Faulkner | G10L 17/00 |
| 2020/0152184 A1* | 5/2020 | Steedman Henderson | |
| | | | G06N 5/02 |
| 2021/0006660 A1* | 1/2021 | Adibi | G06F 40/174 |
| 2021/0136207 A1* | 5/2021 | Adibi | G10L 13/027 |
| 2021/0158812 A1* | 5/2021 | Wooters | G10L 15/197 |
| 2021/0335352 A1* | 10/2021 | Kobayashi | G10L 15/26 |
| 2021/0397311 A1* | 12/2021 | Soini | H04M 3/5183 |
| 2021/0398523 A1* | 12/2021 | Sekine | G06F 16/433 |
| 2021/0407499 A1* | 12/2021 | Sun | G06F 40/30 |
| 2022/0131717 A1* | 4/2022 | Kwatra | G10L 15/1815 |
| 2022/0138770 A1* | 5/2022 | Lee | G10L 15/26 |
| | | | 705/7.29 |
| 2022/0148578 A1* | 5/2022 | Sekine | G10L 15/183 |
| 2022/0295184 A1* | 9/2022 | Nishio | H04R 1/026 |
| 2022/0399011 A1* | 12/2022 | Sekine | G10L 15/32 |
| 2023/0239407 A1* | 7/2023 | Kakemura | G10L 15/08 |
| | | | 455/3.05 |
| 2024/0331692 A1* | 10/2024 | Sekine | G10L 15/26 |
| 2024/0379106 A1* | 11/2024 | Sekine | G10L 15/22 |

FOREIGN PATENT DOCUMENTS

| | | | | |
|---|---|---|---|---|
| JP | 6739811 B | 7/2020 | | |
| WO | WO-2019171645 A1 * | 9/2019 | | |
| WO | WO-2020153111 A1 * | 7/2020 | | G06F 40/103 |

OTHER PUBLICATIONS

Written Opinion of International Patent Application No. PCT/JP2022/012380 completed on Jun. 2, 2022 and mailed Jun. 14, 2022 (3 pages).

* cited by examiner

| Type | Meaning | Conjunction to be used | Type | Meaning | Conjunction to be used |
|---|---|---|---|---|---|
| Normal connection | Indicating a case where a previous matter becomes a cause or a reason and a following matter becomes a result or conclusion. | So, then, therefore, for this reason, thereupon, accordingly, hence, for that reason, consequently, on that account, that being the case | Selection | Selecting between a previous matter and a following matter | or, alternatively |
| | | | Explanation | Presenting an explanation of a previous matter | because, cause, that is, that is because, the reason is because, |
| Reverse connection | Indicating a case where a result contradictive to a result expected from a previous matter is produced. | but, however, so, even so, nevertheless, notwithstanding, although, in spite of that, still, despite that | Main point | Presenting a matter that is a main point regarding a previous matter | basically, primarily |
| | | | Supplement | Adding to a previous matter | note that, however, but, of course, incidentally, in the first place, actually, in actuality, |
| Juxtaposition | Aligning a following matter with a previous matter | in addition, and, also, as well, similarly | Rephrase | Rephrasing a previous matter | that is, in short, namely |
| Enumeration | Describing an order when a following matter is lined up with respect to a previous matter | Firstly ···, secondly ···, thirdly ··· First ···, next ··· finally ···. In the beginning, ···, subsequently, ···, eventually, ···. The first one is ···, the second one is ··· the third one is ···. The first point is ···, the second point is ···, the third point is ···. One is ···, another is ···. One point is ···, another point is ···. | Example | Showing an example of a previous matter | for example, so to speak |
| | | | Attention | Taking something up from a previous matter and calling attention to it | especially, among others, particularly |
| | | | Change | Changing a subject or a situation from a previous matter | now, then, by the way |
| Addition | Adding a following matter to a previous matter | and, besides, what is more, furthermore, moreover, in addition, above that | Conclusion | Presenting a conclusion of a previous matter | thus, as above, in any case, anyhow, anyway |
| | | | Contrast | Presenting two contrastive matters | on one hand, on the other hand |
| Comparison | Comparing a previous matter and a following matter | On one hand, on the other hand, conversely, in contrary, in contrast, instead of | Opposition | Presenting two opposing matters | certainly, but |

| MR | | | Dr.A |
|---|---|---|---|
| | Greeting | Counter-argument | −1 |
| +1 | Agreement | | |
| +1 | Question | | |
| | | Description | −1 |
| | | Excuse | −1 |
| +1 | Agreement | | |
| +1 | Description | | |
| +1 | Description | | |
| | | Explanation | +1 |
| | | Confirmation | +1 |
| +1 | Agreement | | |
| +1 | Description | | |
| +1 | Description | | |
| | | Agreement | +1 |
| | | Promise | +1 |
| | Affirmation | | |

Total  >

CONVERSATION ASSISTANCE METHOD USING COMPUTER

TECHNICAL FIELD

The present invention relates to a conversation assistance method using a computer.

BACKGROUND ART

Japanese Patent No. 6739811 describes a presentation assistance device for calling attention against a word that is forbidden to speak. This device outputs keywords and an alert related to NG (no-good) words. Further, this device adds up evaluation points regarding the keywords, related terms, and the NG words included in a presentation, and obtains an evaluation point regarding the whole presentation.

CITATION LIST

Patent Literature

Patent Document 1: Japanese Patent No. 6739811

DISCLOSURE OF THE INVENTION

Problems to be Solved by the Invention

The above-described device is excellent for evaluating a presentation. However, the above-described device is for evaluating the presentation as a whole, and is not for evaluating a conversation in real time. Therefore, an object of the present invention is to provide a conversation assistance method that ensures evaluating a conversation in real time.

Solutions to the Problems

The first invention of this description relates to a conversation assistance method using a computer. The method executed by the computer includes a voice analysis step, a word group analysis step, and a remark evaluation step. The voice analysis step is a step of analyzing a voice related to a conversation and obtaining a voice word that is a word included in the conversation. The word group analysis step is a step of analyzing which among a plurality of term groups the voice word corresponds to. The term group includes either one of or both of a word and a phrase. The remark evaluation step is a step of evaluating a remark every time a remark related to the conversation is input, based on the term group analyzed in the word group analysis step.

The plurality of term groups include, for example, any one or two or more term groups of a greeting-related term group, a counterargument-related term group, a description-related term group, a suspicion-related term group, an excuse-related term group, an agreement-related term group, a promise-related term group, and an affirmation-related term group.

The above-described method is preferred to further include a recommended term group displaying step of displaying a recommended term group that is a term group desired to be used next by using the term group analyzed in the word group analysis step by the computer.

The above-described method is preferred to further include a step of inputting a scheduled time of the conversation into the computer, and the recommended term group displaying step includes displaying the recommended term group by further using the scheduled time of the conversation.

The above-described method is preferred to further include an image displaying step of displaying an image related to the term group analyzed in the word group analysis step by the computer.

The next invention of this description is related to a program and a computer-readable information recording medium that stores the program. The program is for causing the computer to implement each method described above.

Advantageous Effects of the Invention

With the present invention, a conversation assistance method that ensures evaluating a conversation in real time can be provided.

BRIEF DESCRIPTION OF THE DRAWINGS

FIG. 4 is a table substituted for a drawing illustrating an example of a term group.

DESCRIPTION OF PREFERRED EMBODIMENTS

The following describes configurations to embody the present invention using the drawings. The present invention is not limited to the configurations described below, but includes those appropriately modified from the configurations below by a person skilled in the art within an obvious range.

Figure 1:
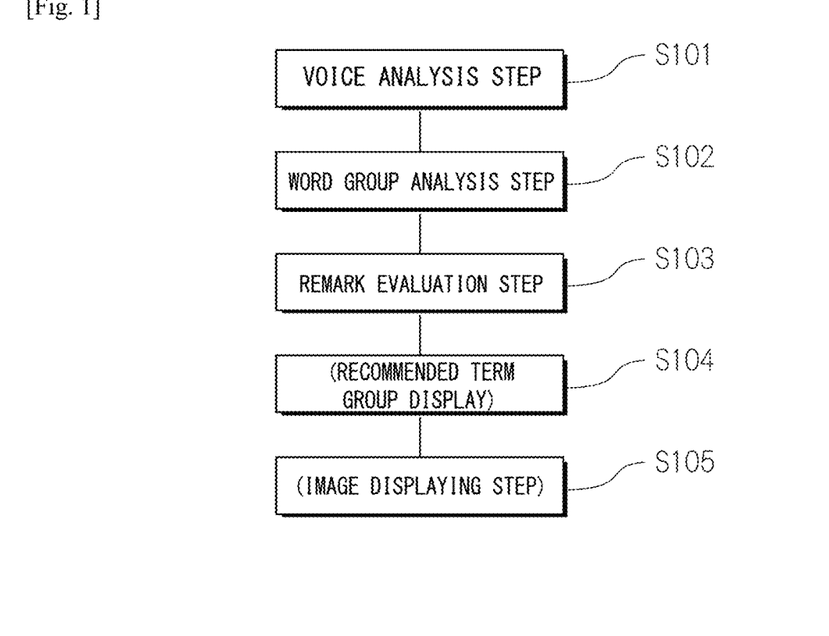
FIG. 1 is a flowchart for describing a conversation assistance method using a computer.

A conversation assistance method using a computer will be described. FIG. 1 is a flowchart for describing the conversation assistance method using a computer. This method includes a voice analysis step (S101), a word group analysis step (S102), and a remark evaluation step (S103). As shown in FIG. 1, this method may further include either one of or both of a recommended term group displaying step (S104) and an image displaying step (S105).

Figure 2:
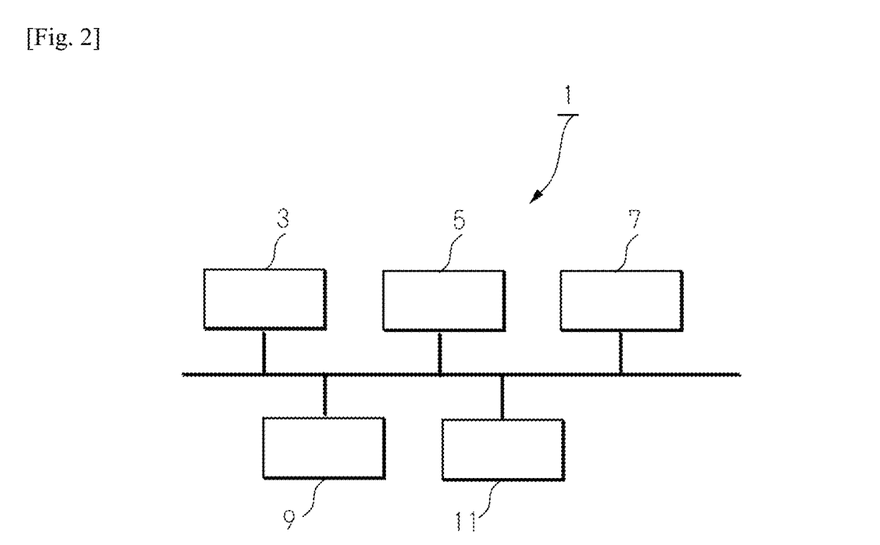
FIG. 2 is a block diagram of a conversation assistance device for achieving the conversation assistance method.

FIG. 2 is a block diagram of a conversation assistance device for achieving the conversation assistance method. As shown in FIG. 2, this device 1 includes a voice analysis unit 3, a word group analysis unit 5, and a remark evaluation unit 7. As shown in FIG. 2, either one of or both of a recommended term group display unit 9 and an image display unit 11 may further be included. The conversation assistance device is a system based on a computer, and each unit is basically an element for implementing each step described above. For example, the voice analysis unit 3 is an element for analyzing a voice related to a conversation and obtaining a voice word that is a word included in the conversation. The word group analysis unit 5 is an element for analyzing which among a plurality of term groups the voice word corresponds to. The remark evaluation unit 7 is an element for evaluating a remark every time a remark related to the conversation is input, based on the analyzed term group. The recommended term group display unit 9 is an element for displaying a recommended term group that is a term group desired to be used next by using the term group analyzed in the word group analysis step. The image display unit 11 is an element for displaying an image related to the term group.

The computer includes an input unit, an output unit, a control unit, a calculation unit, and a storage unit, and the respective elements are coupled by a bus or the like so as to ensure transmitting and receiving information. For example, in the storage unit, a control program may be stored, or various information may be stored. When predetermined information is input from the input unit, the storage unit reads out the control program stored in the storage unit. Subsequently, the control unit reads out the information stored appropriately in the storage unit and transmits it to the calculation unit. Further, the control unit transmits the appropriately input information to the calculation unit. The calculation unit performs a computation process using the received various information, and stores it in the storage unit. The control unit reads out the result of the computation process stored in the storage unit and outputs it through the output unit. Various processes and respective steps are thus performed. What performs these various processes are the respective units and respective means.

The device of the present invention may include a terminal connected to a network, such as the Internet or an intranet, and a server connected to the network. Surely, a single computer or a mobile terminal may function as the device of the present invention, or a plurality of servers may exist.

Voice Analysis Step (S101)

Figure 3:
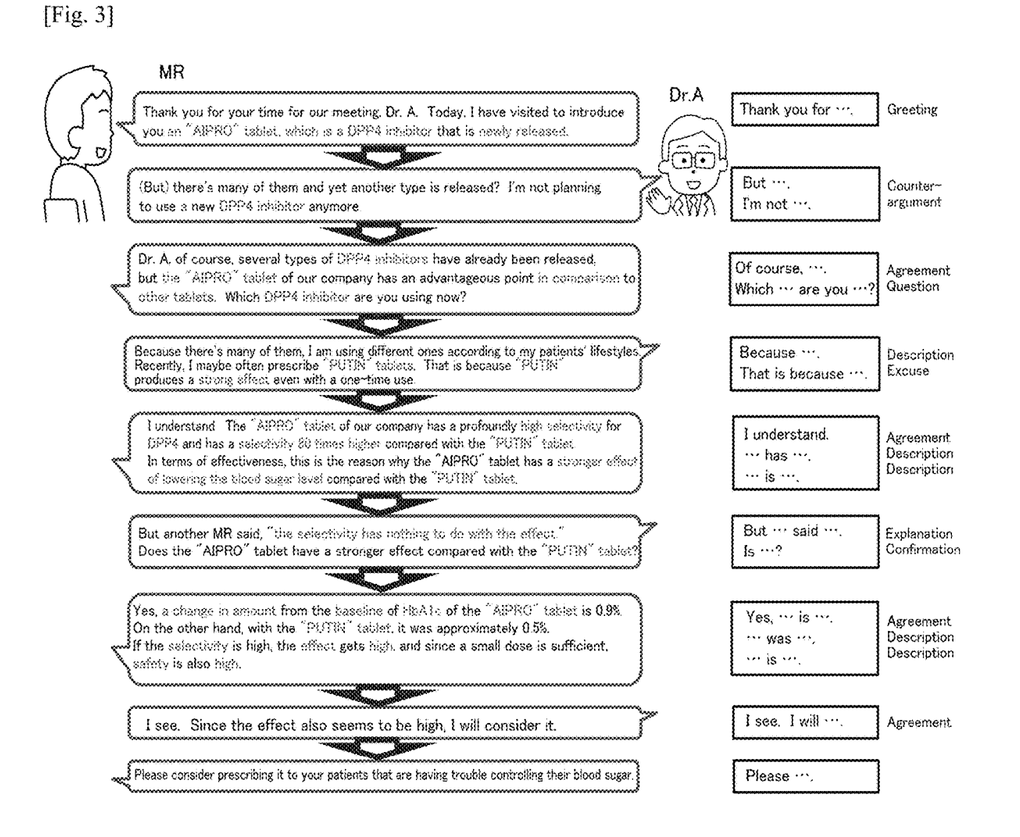
FIG. 3 is a conceptual diagram depicting an example of performing a voice analysis.

The voice analysis step is a step of analyzing a voice related to a conversation and obtaining a voice word that is a word included in the conversation by the computer. The conversation may be one in which persons mutually talk to one another, one in which a performer gives a description to an audience, or a presentation. It may also be a conversation between a sales person and a customer, or a conversation between a question or an inquiry on a phone call and a call responder. The voice is usually a human voice. Surely, the voice includes a pseudo voice of a computer. FIG. 3 is a conceptual diagram depicting an example of performing a voice analysis. In the example shown in FIG. 3, a conversation between an MR and a doctor (Dr. A) is input to the device. This device may be a device connected to a terminal of the MR and a terminal of Dr. or the device may be connected to either one of the terminals. Voices related to the conversation may be input to each terminal through a microphone of the MR's terminal and a microphone of Dr. A's terminal, and the voices related to the conversation may be input to the device through each terminal. Further, a microphone of the device may directly input the voices related to the conversation of the MR and the doctor (Dr. A) into the device. The control unit of the device appropriately reads out the voices from the storage unit and causes the calculation unit to analyze the input voice. Thus, the device obtains words (voice words) included in the conversation. Such voice analysis device is publicly known. The device may store the obtained voice words in the storage unit.

An analysis example of the voice words shown in FIG. 3 are as follows.

MR: Thank you for your time for our meeting, Dr. A. Today, I have visited to introduce you an "AIPRO" tablet, which is a DPP4 inhibitor that is newly released. Dr. A: (But) there's many of them and yet another type is released? I'm not planning to use a new DPP4 inhibitor anymore.

MR: Dr. A, of course, several types of DPP4 inhibitors have already been released, but the "AIPRO" tablet of our company has an advantageous point in comparison to other tablets. Which DPP4 inhibitor are you using now?

Dr. A: Because there's many of them, I am using different ones according to my patients' lifestyles. Recently, I maybe often prescribe "PUTIN" tablets. That is because "PUTIN" produces a strong effect even with a one-time use.

Word Group Analysis Step (S102)

The word group analysis step is a step of analyzing which among the plurality of term groups the voice words correspond to by the computer. The term group includes either one of or both of words and phrases. The storage unit of the device stores words and phrases included in each term group. The control unit of the device causes the calculation unit to perform a calculation of collating the voice words with the words and phrases included in each term group. Thus, the voice words are analyzed which term group they are included in. The analyzed analysis result may be stored in the storage unit.

FIG. 4 is a table substituted for a drawing illustrating an example of the term group. The term group may be a combination of words and phrases that are divided into groups of various elements. Further, the term group may be any one of or two or more of a term that must be spoken, a keyword, and an NG term (term that must not be spoken). The plurality of term groups may be divided into term groups that lead the conversation in a desirable direction and term groups that lead the conversation in an undesirable direction. Further, the plurality of term groups include, for example, any one or two or more term groups of a greeting-related term group, a counterargument-related term group, a description-related term group, a suspicion-related term group, an excuse-related term group, an agreement-related term group, a promise-related term group, and an affirmation-related term group. Note that, these term groups need not be stored in the computer as, for example, a "greeting-related term group."

Figure 5:
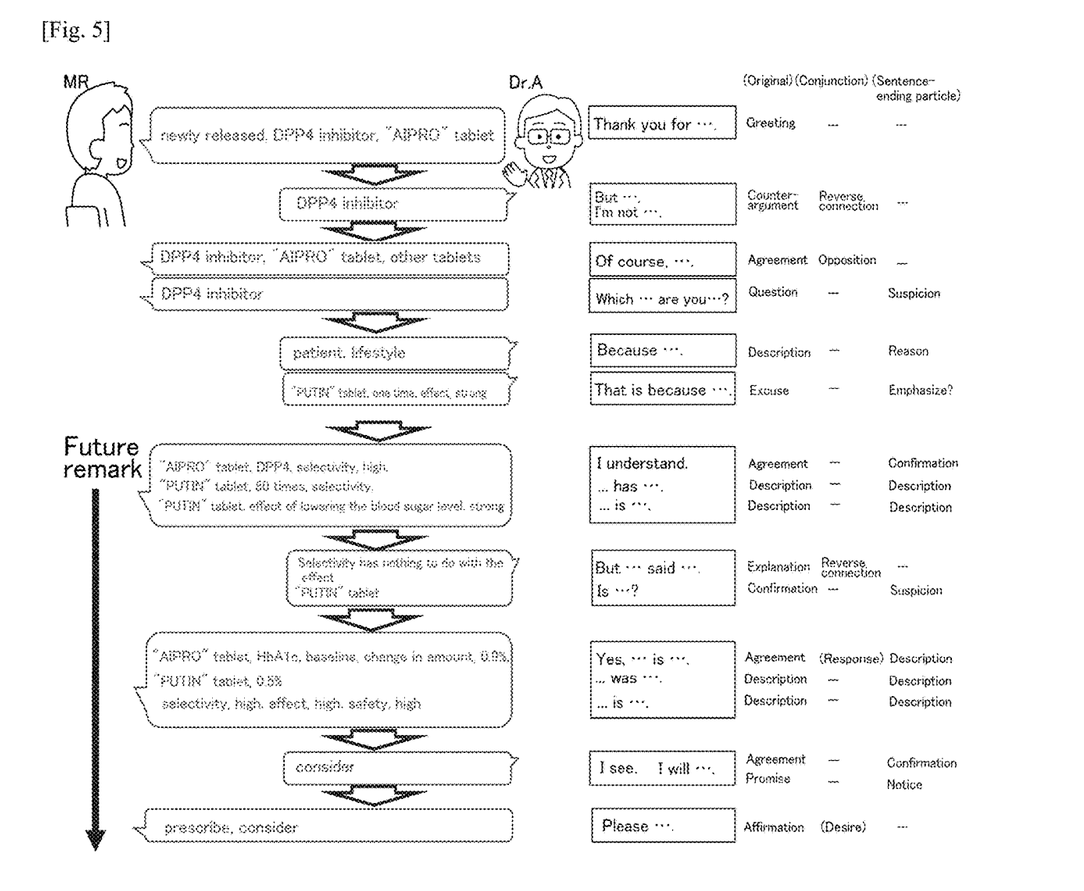
FIG. 5 is a conceptual diagram depicting an example of analyzing a word group.

FIG. 5 is a conceptual diagram depicting an example of analyzing a word group. As shown in FIG. 5, for example, the phrase "Thank you for your time for our meeting" is included in the term group "greeting." Therefore, when the MR remarks "Thank you for your time for our meeting, Dr. A," this remark is analyzed as a "greeting." Accordingly, regarding this conversation, the fact that a "greeting" has been performed is stored in the storage unit.

Next, Dr. A remarks "(But) there's many of them and yet another type is released? I'm not planning to use a new DPP4 inhibitor anymore." Upon that, the word combination of "but" and "I'm not planning to" included in Dr. A's remark is analyzed as a "counterargument." Accordingly, regarding this conversation, the fact that a "counterargument" has been performed after the "greeting" is stored in the storage unit.

Remark Evaluation Step (S103)

The remark evaluation step is a step of evaluating a remark every time a remark related to the conversation is input, based on the term group analyzed in the word group analysis step by the computer. For example, an evaluation point is assigned to each term group in the storage unit. It is only necessary for the control unit of the device to read out an evaluation point stored in relation to a term group from the storage unit and evaluate the remark. Note that, the device may simultaneously perform an evaluation of the whole conversation as a collection of remarks. Further, the evaluation point may be stored in the storage unit in relation to a relation between a term group of remarks of one side and a term group of remarks of the other side.

For example, 0 point regarding the term group "greeting" is stored in the storage unit. Further, following the term group "greeting" of remarks of the one side, −1 point regarding the subsequent term group "counterargument" of remarks of the other side is stored in the storage unit. Following the term group "counterargument" of remarks of the one side, +1 point regarding the subsequent term group "counterargument" of remarks of the other side may be stored in the storage unit. The device may be designed to analyze a term included in a conversational sentence and obtain a coefficient. In this case, for example, it may be processed that, when a term related to coefficient 3 (DDP4 inhibitor) is included in the conversation after the first "counterargument," 3 points resulting from 3×(+1) regarding the subsequent term group "counterargument" of remarks of the other side are added. In this case, the device may store point-adding terms and point-adding coefficients and analyze the conversational sentence. When it is grasped that a point-adding term is included, a point-adding coefficient is temporarily stored, and it is only necessary to multiply the point-adding coefficient on the evaluation point upon a remark evaluation. For example, the point-adding term and the point-adding coefficient are stored in the storage unit in relation to a material (such as a presentation material), and the point-adding term and the point-adding coefficient relating to the material may be read out appropriately when a conversation related to the material takes place.

Figure 6:
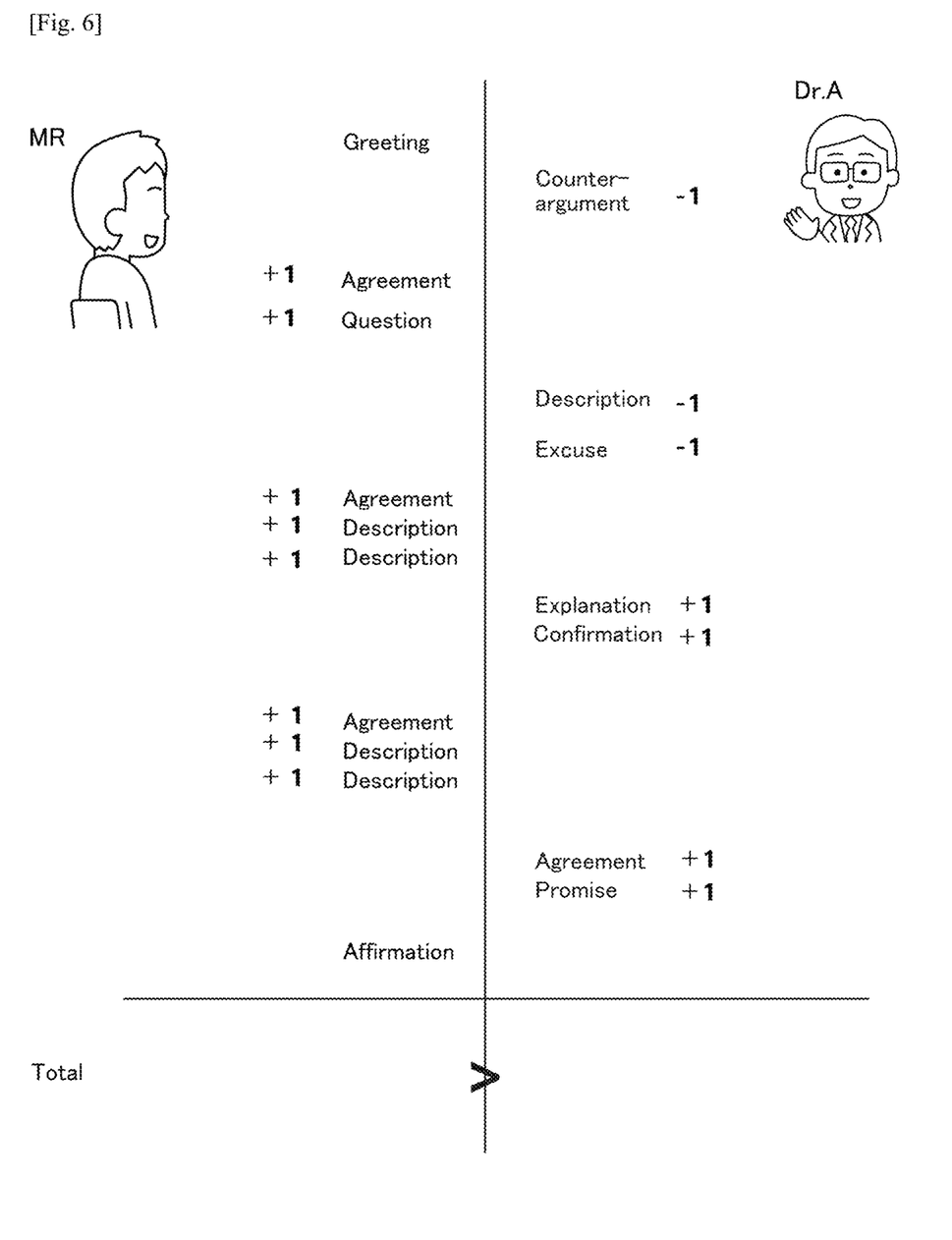
FIG. 6 is a conceptual diagram depicting an example of a remark evaluation.

FIG. 6 is a conceptual diagram depicting an example of a remark evaluation. In relation to "Thank you your time for our meeting, Dr. A. Today, I have visited to introduce you an "AIPRO" tablet, which is a DPP4 inhibitor that is newly released," the term group "greeting" is stored in the device. Therefore, the control unit of the device reads out 0 points as the evaluation point related to the term group "greeting" from the storage unit. Accordingly, this remark is evaluated to have 0 point.

Next, Dr. A remarks "(But) there's many of them and yet another type is released? I'm not planning to use a new DPP4 inhibitor anymore."

In relation to this remark, the term group "counterargument" is stored in the device. Accordingly, the control unit of the device reads out −1 point as the evaluation point in relation to the subsequent term group "counterargument" of the other side after the term group "greeting" of remarks of the one side. Thus, the remarks are evaluated in real time.

Further, the device stores past evaluation values included in the conversation up to the present remark. The device performs a calculation of adding the evaluation values of the present remark. Thus, the device can obtain an evaluation point up to a time point at which a certain remark has been made in the conversation. Subsequently, the obtained evaluation points of the conversation up to a time point at which a certain remark is made may be appropriately stored in the storage unit and be output.

Figure 7:
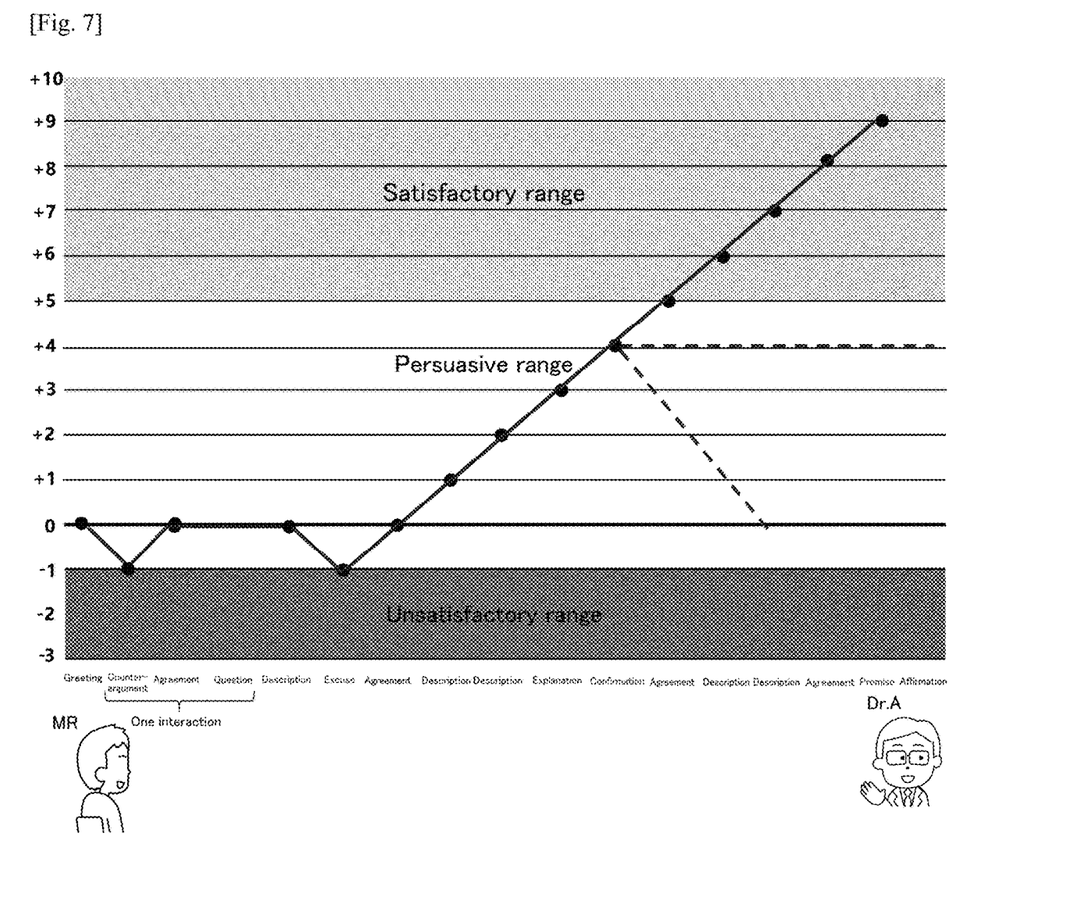
FIG. 7 is a conceptual diagram depicting an example of evaluating remarks and a conversation in real time.

FIG. 7 is a conceptual diagram depicting an example of evaluating remarks and a conversation in real time. As shown in FIG. 7, in this example, every time a remark is made, the remark and the conversation that have led to the remark are evaluated, and the evaluation contents, such as ↓↓↑↑, are displayed in real time on a display unit of a terminal of a person giving a description, a performer, or a presenter.

The above-described method is preferred to further include a recommended term group displaying step in which a computer is configured to display a recommended term group that is a term group desired to be used next by using a term group analyzed in the word group analysis step. The device stores a term group that is preferred to be spoken after a certain term group or a third term group that is desired to be spoken next in a case where a second term group comes after a first term group. The device analyzes the remark and uses information regarding term groups to which the remark, a previous remark, and a further previous remark belong, and reads out a term group that is desired to be spoken next from the storage unit. Subsequently, the device outputs a term included in the read out term group that is preferred to be spoken next. Accordingly, the term is displayed on an output unit (such as a monitor) of a speaker's terminal. Thus, the device can assist a speaker to perform a conversation.

Figure 8:
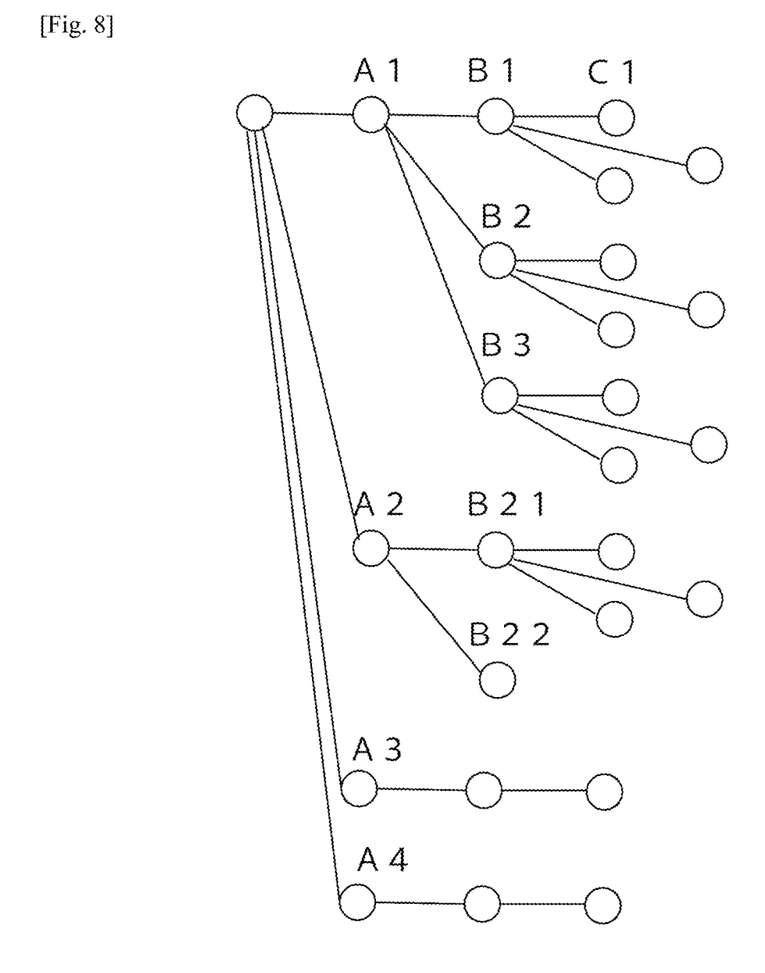
FIG. 8 is a conceptual diagram depicting an example of a recommended term group.

FIG. 8 is a conceptual diagram depicting an example of a recommended term group. For example, in a case where a term group referred to as A1 is used after a certain term group, a term group B1, a term group B2, and a term group B3 (or terms selected from these term groups and terms included in these term groups) may be displayed on the speaker's output unit as recommended term groups, or the term group B1 and a term group C1 may be displayed as the best recommended term groups.

The above-described method may further include a step of inputting a scheduled time of the conversation into the computer. The recommended term group displaying step is preferred to further use the scheduled time of the conversation and display the recommended term group. The scheduled time of the conversation may be a time when the conversation starts and a time when the conversation ends, or a duration of the conversation (such as within one hour). The device is preferred to have a clock unit for measuring a time or a time period. The storage unit divides the conversation into conversation time domains such as the beginning, the middle, and the end. Subsequently, the storage unit assigns identification information corresponding to a conversation time domain to a term included in the term group, and stores the information. Accordingly, the device can read out a term corresponding to a conversation time domain of the conversation when reading out a term included in the term group, and output the term.

For example, a conversation ending term that is a term for ending a conversation as a recommended term group can be stored in the storage unit, and when it is before a predetermined time within a scheduled time of the conversation or near the end of the conversation, it is only necessary to read out the conversation ending term and display it appropriately. Accordingly, a lecture or a presentation can be ended within a predetermined time period. Examples of the conversation ending term are "To rap this up" or "To concisely describe the rest, . . . ."

The above-described method is preferred to further include an image displaying step in which the computer is configured to display images related to a term group analyzed in the word group analysis step. An example of the images related to the term group is an evaluation point regarding a term group or an arrow head sign (such as, ↑↓) indicating an evaluation point. The storage unit stores these images related to these term groups. The device grasps a term group related to a remark thereof. Accordingly, the device uses information related to the grasped term group and reads out an image related to the term group from the storage unit. The device outputs the read out image. For example, in a case where the image is related to the evaluation value, a person can instantly grasp whether his/her remark was positive or negative.

The next invention of this description is related to a program or a computer-readable information recording medium that stores the program. The program is for causing the computer to implement each method described above. The program, for example, causes the computer to function so as to analyze a voice related to a conversation, obtain a voice word that is a word included in the conversation, analyze which among a plurality of term groups the voice word corresponds to, and evaluate a remark every time a remark related to the conversation is input, based on the analyzed term group.

INDUSTRIAL APPLICABILITY

The present invention can be used in the information industry.

DESCRIPTION OF REFERENCE SIGNS

1 . . . conversation assistance device
3 . . . voice analysis unit
5 . . . word group analysis unit
7 . . . remark evaluation unit
9 . . . recommended term group display unit
11 . . . image display unit

The invention claimed is:

1. A computer-implemented method for assisting a computer-implemented conversation comprising executing on a processor: a step of
   receiving by a microphone, voice data from a conversation;
   inputting the voice data into a memory;
   analyzing a voice related to a conversation and obtaining a voice word that is a word included in the conversation;
   analyzing which among a plurality of term groups the voice word corresponds to, the term group including either one of or both of a word and a phrase;
   storing an evaluation point in relation to a relation between a term group of remarks of one side and a term group of remarks of the other side in the memory; and
   evaluating a remark every time a remark related to the conversation is input, based on the evaluation point in relation to the relation between the term group of remarks of one side and the term group of remarks of the other side in the memory;
   assigning identification information corresponding to a conversation time domain to a term included in the term group; and
   determining the conversation time domain to which current conversation time belongs;
   wherein a recommended term group that is a term group desired to be used next by using the term group analyzed, the evaluation point and the determined conversation time domain by the computer is displayed on a display.

2. The method according to claim 1, wherein
   the plurality of term groups include any one or two or more term groups of a greeting-related term group, a counterargument-related term group, a description-related term group, a suspicion-related term group, an excuse-related term group, an agreement-related term group, a promise-related term group, and an affirmation-related term group.

3. The method according to claim 1, further comprising
   a step of inputting a scheduled time of the conversation into the computer, wherein
   the recommended term group displaying step includes displaying the recommended term group by further using the scheduled time of the conversation.

4. The method according to claim 1, further comprising
   a step of displaying an image related to the term group analyzed in the word group analysis step by the computer.

5. A non-transitory computer-readable information recording medium that stores a program, wherein when the program is executed, it performs:
   receiving by a microphone, voice data from a conversation;
   inputting the voice data into a memory;
   analyzing a voice related to a conversation and obtaining a voice word that is a word included in the conversation;
   analyzing which among a plurality of term groups the voice word corresponds to, the term group including either one of or both of a word and a phrase;
   storing an evaluation point in relation to a relation between a term group of remarks of one side and a term group of remarks of the other side in the memory; and
   evaluating a remark every time a remark related to the conversation is input, based on the evaluation point in relation to a relation between the term group of remarks of one side and the term group of remarks of the other side in the memory;
   assigning identification information corresponding to a conversation time domain to a term included in the term group; and
   determining the conversation time domain to which current conversation time belongs;
   wherein a recommended term group that is a term group desired to be used next by using the term group analyzed and the evaluation point and the determined conversation time domain by the computer is displayed on a display.

* * * * *